US009475912B1

(12) United States Patent
White et al.

(10) Patent No.: US 9,475,912 B1
(45) Date of Patent: Oct. 25, 2016

(54) OPTICALLY FIXABLE SHAPE MEMORY POLYMERS

(71) Applicant: The United States of America, as represented by the Secretary of the Air Force, Washington, DC (US)

(72) Inventors: Timothy J. White, Centerville, OH (US); Kyung Min Lee, Dayton, OH (US)

(73) Assignee: The United States of America, as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 14/833,347

(22) Filed: Aug. 24, 2015

Related U.S. Application Data

(63) Continuation of application No. 13/272,775, filed on Oct. 13, 2011, now abandoned.

(51) Int. Cl.
*C07J 7/00* (2006.01)
*C08J 7/12* (2006.01)

(52) U.S. Cl.
CPC ............ *C08J 7/123* (2013.01); *C08J 2339/04* (2013.01)

(58) Field of Classification Search
CPC .................................................... C08J 2/00
See application file for complete search history.

(56) References Cited

U.S. PATENT DOCUMENTS 6,720,402 B2 * 4/2004 Langer .................. B29C 61/003 525/415

OTHER PUBLICATIONS

Lee et al., Relationship Between the Photomechanical Response and the Thermo-mechanical Properties of Azobenzene Liquid Crystalline Polymer Networks, Macromolecules Aug. 2010.*

Andreas Lendlein, Hongyan Jiang, Oliver Junger, Robert Langer, Light-induced shape-memory polymers, Nature, pp. 879-882, vol. 434, Apr. 14, 2005, Nature Publishing Group.

Kyung Min Lee, Hilmar Koerner, Richard Vaia, Timothy Bunning, Timothy White, Relationships between the Photomechanical Response and the Thermomechanical Properties of Azobenzene Liquid Crystalline Polymer Networks, Macromolecules Article, American Chemical Society, (Aug. 2010).

Ernie Havens, Emily Snyder, Tat Hung Tong, Light-Activated shape memory polymers and associated applications, Smart Structures and Materials 2005, pp. 48-55, vol. 5762, Industrial and Commercial Applications for Smart Structures Technologies.

Richard V. Beblo, Lisa Mauck Weiland, Light Activated Shape Memory Polymer Characterization, pp. 1-8, vol. 76, Journal of Applied Mechanics, (Aug. 25, 2011).

Richard V. Beblo, Lisa Mauck Weiland, Material characterization and multi-scale modeling of light activated, pp. 1-8, vol. 7290, Industrial and Commercial Applications of Smart Structures Technologies 2009.

* cited by examiner

*Primary Examiner* — Robert Harlan
(74) *Attorney, Agent, or Firm* — AFMCLO/JAZ; James Carey

(57) ABSTRACT

This application discloses a method of photomechanically manipulating optically fixable SMPs that employ glassy, photoresponsive polymeric materials, which are capable of rapid optical-fixing with short exposures (<<5 min) of eye-safe visible light. Key to the optical fixing is the use of polymeric materials composed of covalently attached photochromic units such as azobenzene and the use of light capable of inducing simultaneous trans-cis and cis-trans isomerization of azobenzene or other photochromic moieties capable of similar cycling. Upon exposure to light in this wavelength regime (440-514 nm for the azobenzene unit here), real and lasting reconfigurations are induced capable of fixing both the optically induced strain as well as mechanically induced strain. A linear dependence of bending angle on polarization angle is observed and may be used to control the shape reconfiguration of the SMPs.

8 Claims, 7 Drawing Sheets

OPTICALLY FIXABLE SHAPE MEMORY POLYMERS

CROSS-REFERENCE TO RELATED APPLICATIONS

This application is a continuation application that claims priority from U.S. patent application Ser. No. 13/272,775, which was filed on Oct. 13, 2011 and is incorporated herein by reference in its entirety.

RIGHTS OF THE GOVERNMENT

The invention described herein may be manufactured and used by or for the Government of the United States for all governmental purposes without the payment of any royalty.

BACKGROUND OF THE INVENTION

The invention relates to the employment of glassy, photoresponsive polymeric materials as optically fixable shape memory polymers in which the shape fixing mechanism is due to non-reactive, photoinduced reconfigurations of the polymer network morphology.

Shape memory polymers (SMPs) are stimuli-responsive materials that remember an original, so-called "permanent shape" that can be recovered from a temporary fixed shape by exposure to external stimuli such as heat, electricity, moisture, solvent, or magnetic field. Shape fixing is most commonly observed by heating the polymeric material above a transition temperature, which can be the glass transition ($T_g$), melting ($T_m$), or a crystalline clearing temperature ($T_{cl}$). Recent work in the area has demonstrated polymeric materials with multiple transitions can exhibit two-way shape memory (2W-SM) behaviour and so-called triple shape memory in systems possessing both chemical and physical crosslinking. Realization of multiple temporary shapes is critical to the employment of SMP in more complex applications.

Only a few patents/publications address what has been previously referred to as light-activated shape memory. Directing shape adaptations with light equips a potential user with remote, wireless control in addition to the potential for spatial control with masking or holographic exposure. Both prior reports of light-activated SMP leverage photoinduced changes to the crosslink density of the network to program and release a desired shape. One prior report specifies their system as composed of an interpenetrating network containing up to 10 mol % of cinnamic acid groups, which photocrosslink when subjected to UV light >260 nm for one hour to "photo-fix" a mechanically elongated shape. Subsequent irradiation with UV light <260 nm for one hour decrosslinks and releases the fixed shape. Fixity, a fractional measure of the extent of shape/strain retention, was reported in the range of 0.3-0.5.

SUMMARY OF THE INVENTION

This application discloses optically fixable SMPs that employ glassy, photoresponsive polymeric materials that are capable of rapid optical-fixing with short exposures (<<5 min) of eye-safe 442 nm light. Key to the optical fixing is the use of polymeric materials composed of covalently attached photochromic units such as azobenzene and the use of light capable of inducing adjustments to the polymer network morphology. Exposure to light of 440-514 nm, absorbed nearly equivalently by the trans and cis isomeric states of the azobenzene units used here result in trans-cis-trans reorientation of the azobenzene chromophores in the polymer network. These photochemically induced adjustments to the polymer network morphology are an indefinite change which accordingly is capable of fixing both the optically generated strain as well as mechanically induced strain. Although the model material system is liquid crystalline, liquid crystallinity is not a critical requirement for observing shape fixing in these materials. Optically fixable SMPs have been demonstrated in high performance, azobenzene-functionalized polyimides. Finally, the ability to combine thermal and optically-fixable shape memory is also included in the SMPs of the present invention.

BRIEF DESCRIPTION OF THE DRAWINGS

FIG. 1(*b*) is a plot of the storage modulus (E'), loss modulus (E"), and loss tangent (tan δ) as a function of temperature for the model material, PD-20CL. Inset) Polarized optical micrograph (POM) of PD-20CL.

FIG. 2(*a*) illustrates the magnitude of the bending angle as a function of linear polarization angle for a cantilever composed of PD-20CL exposed to 80 $mW/cm^2$ 442 nm light.

FIG. 2(*b*) illustrates the retention of the optically generated strain apparent in the bent state (i) upon removal of the linearly polarized 442 nm light (ii) (temporary shape). Exposure to right- or left-handed circularly polarized 442 nm light (iii) unlocks the temporary state resulting in all-optical restoration to the permanent state (iv).

FIG. 2(*c*) illustrates the optically fixable shape memory of a free-standing PD-20CL film (i) permanent shape, (ii) mechanical deformation, (iii) optical fixing, and (iv) shape retention (in absence of light) (temporary state). Exposure to right- or left-handed circularly polarized light unlocks the optically fixed temporary state (v) and the material recovers the permanent shape (vi).

FIG. 2(*d*) illustrates optical fixing of mechanically generated strain. The cantilever is originally vertical in the permanent state (i) before being mechanically deformed (e.g. strained) with a tweezers into a temporary shape (ii). Exposure of the mechanically deformed temporary shape with 442 nm light (iii) optically fixes the temporary shape upon removal of the 442 nm light (iv).

FIG. 2(*e*) confirms the importance of optical irradiation to the shape fixing. In the absence of optical irradiation, mechanical deformation of PD-20CL does not retain the deformed state: (i) permanent shape, (ii) mechanical deformation, and (iii) restoration of permanent shape after removal of mechanical deformation.

FIG. 3(*a*) illustrates that from a permanent shape (i), 442 nm irradiation can generated forward (ii, contractile strain) or reverse (iv, expansive strain) bending dictated by the alignment of the linear polarization of the 442 nm light to the long axis of the cantilever (x). Both contractile and expansive strains underlying the directionality of the optically directed bending are fixed upon removal of 442 nm light (iii, v).

FIG. 3(*b*) illustrates that from a permanent shape (i), 375 nm irradiation can also induce large angle forward (ii) and reverse (iii) bending but upon removal of the 375 nm irradiation, the cantilevers slowly unbend to the permanent shape over 15-20 hours.

FIG. 3(*c*) illustrates the photoinduced changes to the PD-20CL model material. (i) Absorption spectrum before irradiation, (ii) absorption spectra of PD-20CL after irradiation with 442 nm, and (iii) absorption spectra of PD-20CL after irradiation with 375 nm.

FIG. 3(*d*) illustrates the underlying photochemical mechanism of the optically fixable shape memory illustrated in FIGS. 2(*a*)-2(*e*).

FIG. 3(*e*) illustrates the small temperature rise observable by imaging the sample during exposure to 442 nm irradiation of 100 mW/cm$^2$.

FIG. 4(*a*) illustrates the fixing of optically generated strain in a prestretched sample of an azobenzene-functionalized polyimide with a glass transition temperature exceeding 200° C. (i) Permanent shape, (ii) optically directed bending (contractile strain) upon exposure to 442 nm light, and (iii) retention of bent shape upon removal of 442 nm irradiation.

FIG. 4(*b*) illustrates the optical fixing of mechanically generated strain in a prestretched sample of an azobenzene-functionalized polyimide with a glass transition temperature exceeding 200° C. (i) Mechanically deformed shape, (ii) exposure to 442 nm irradiation, and (iii) retention of mechanically deformed shape upon removal of the 442 nm irradiation.

DETAILED DESCRIPTION

Glassy, azobenzene containing liquid crystal polymer networks (azo-LCN) were synthesized by photoinitiated polymerization of RM257 (procured from Merck) and 4-4'-bis[6-(acryoloxy)hexyloxy]-azobenzene (2azo) by 1 wt % of the inorganic photoinitiator Irgacure 784 (1-784) (procured from Ciba). Both polydomain and monodomain orientations were synthesized and exhibit optically-fixable shape memory.

Figure 1A:
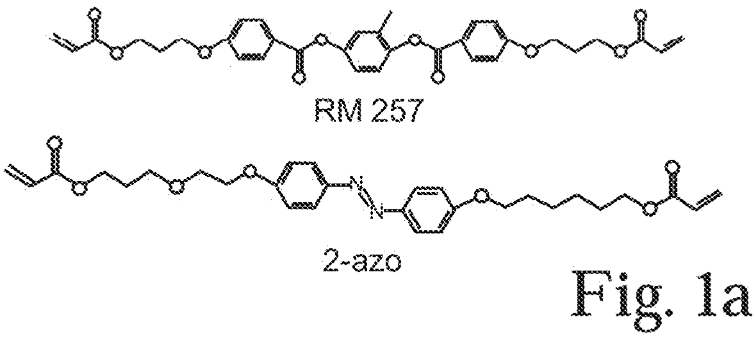
FIG. 1(*a*) is a schematic illustrating the chemical structures of the crosslinking monomers RM257) and 4-4'-bis[6-(acryoloxy)hexyloxy]-azobenzene (2azo), that were copolymerized to form the model material system, referred to here as PD-20CL.
Figure 1B:
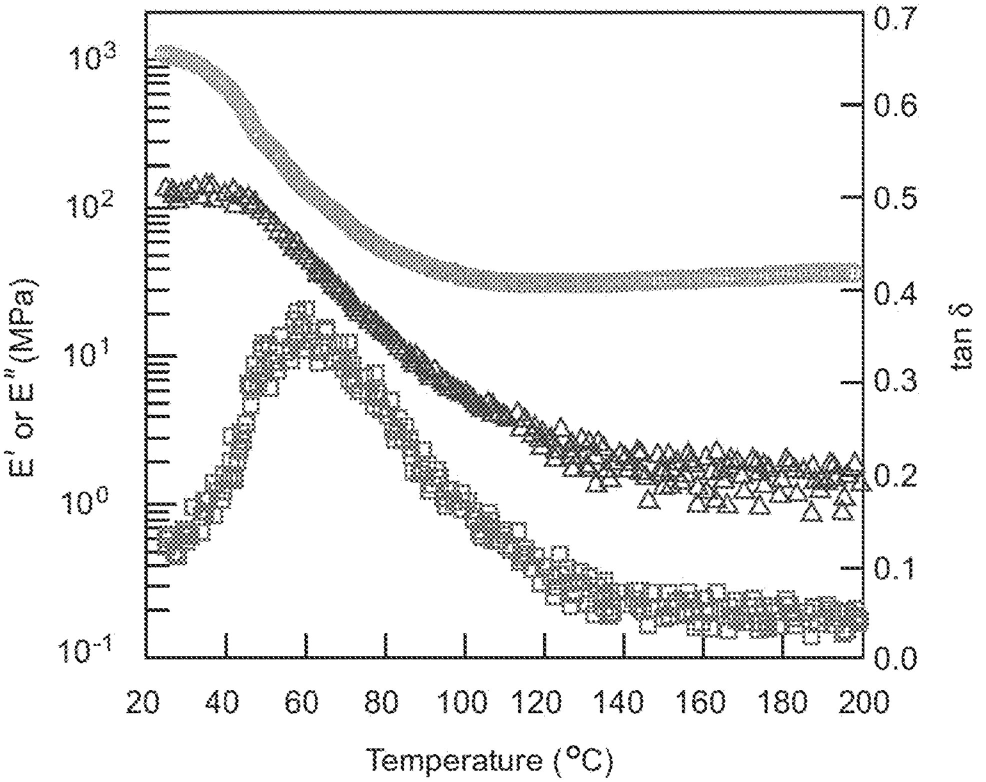
Figure 2A:
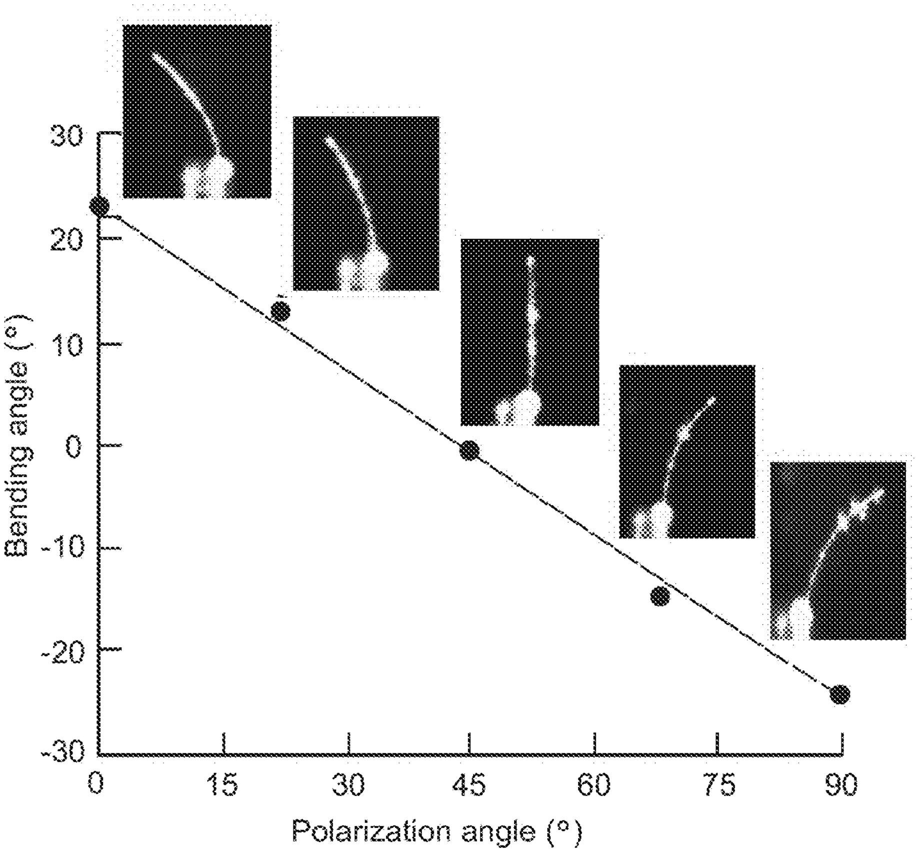
FIGS. 2(*a*)-2(*e*) illustrate optically fixable shape memory behavior in glassy, photoresponsive polymers.
Figure 2B:
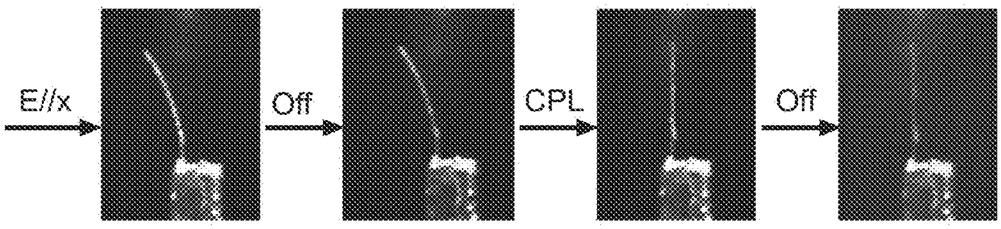
Figure 2C:
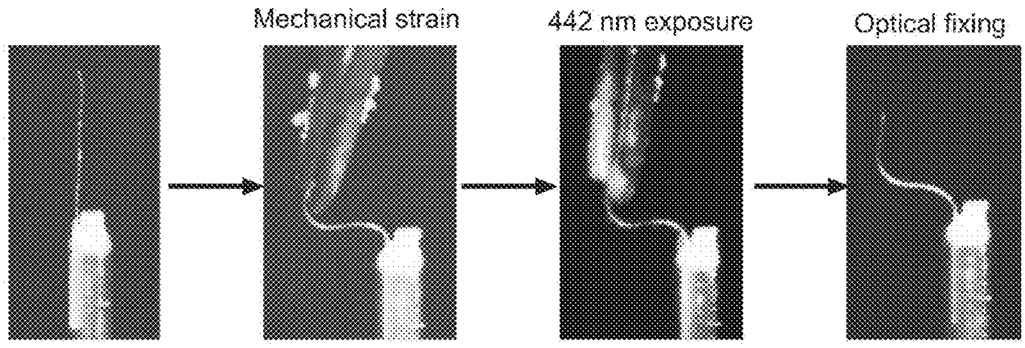
Figure 2D:
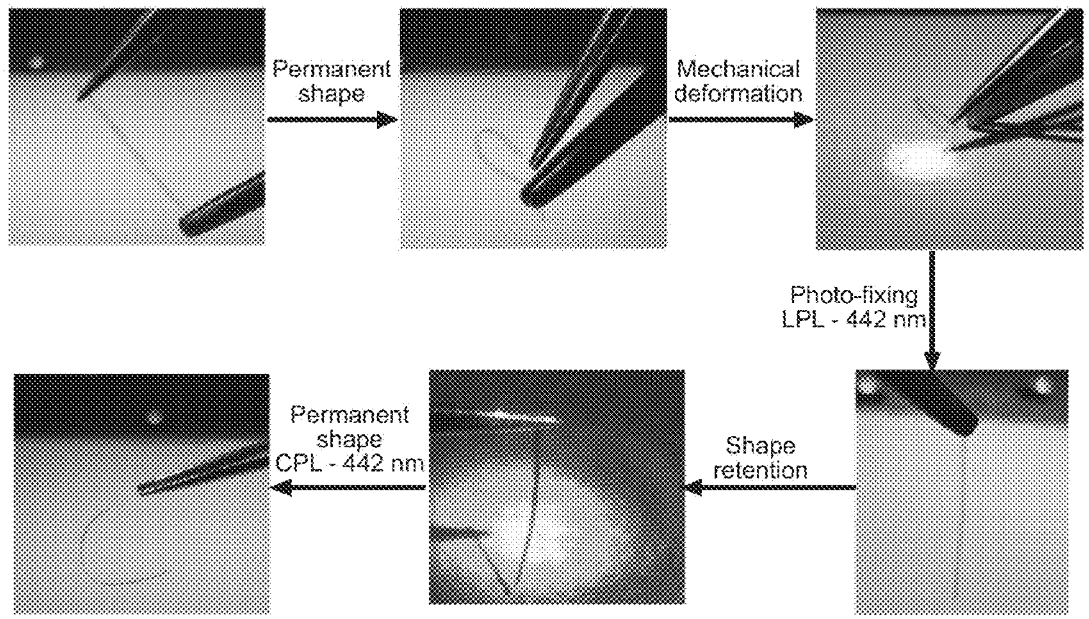
Figure 2E:
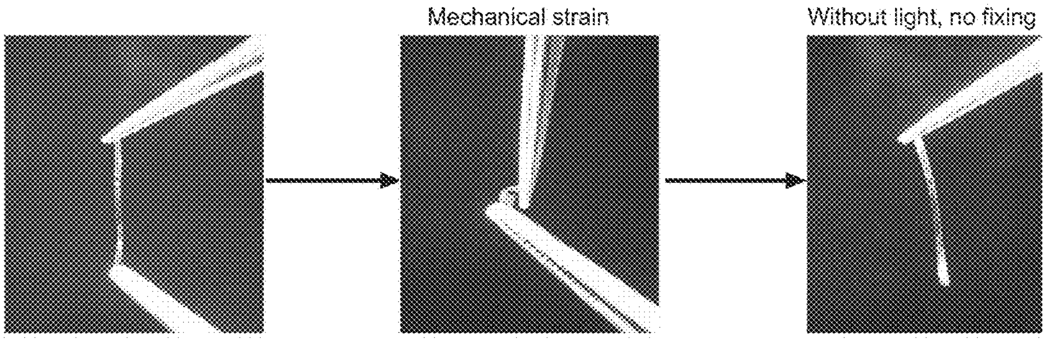
Figure 3A:
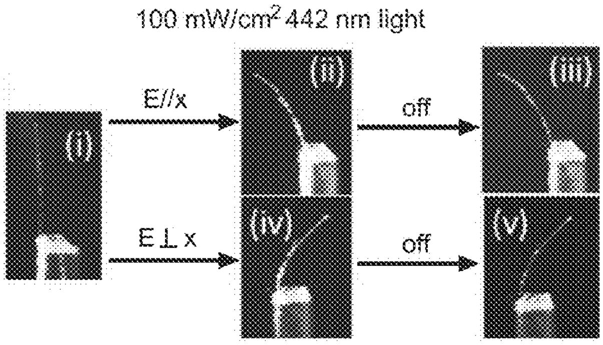
FIGS. 3(*a*)-3(*e*) illustrate the importance of the wavelength of optical irradiation on the optically fixable shape memory.
Figure 3B:
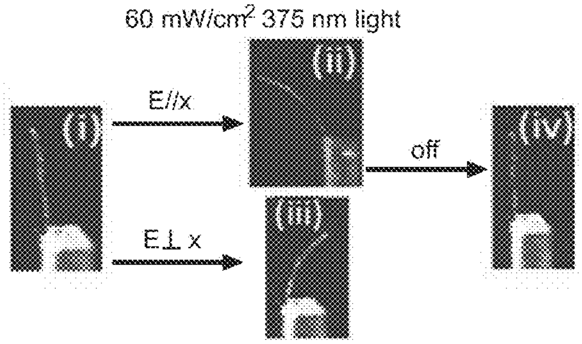
Figure 3C:
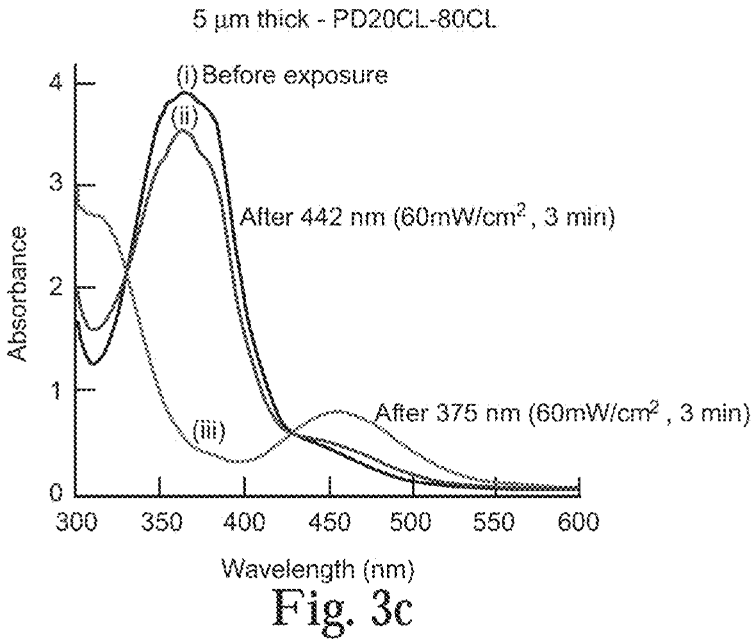
Figure 3D:
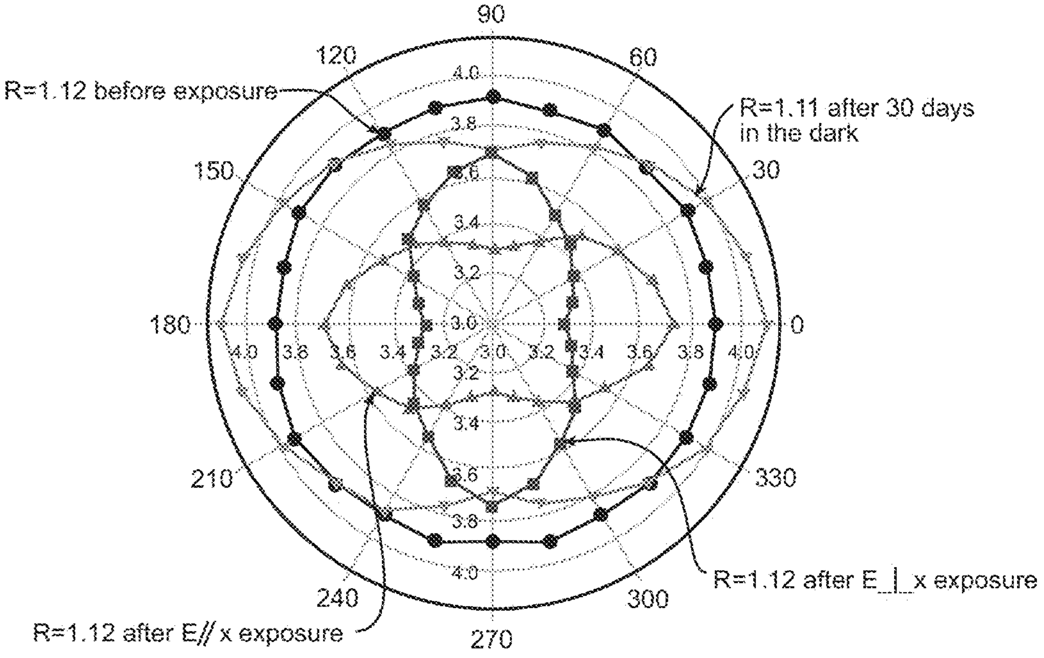
Figure 3E:
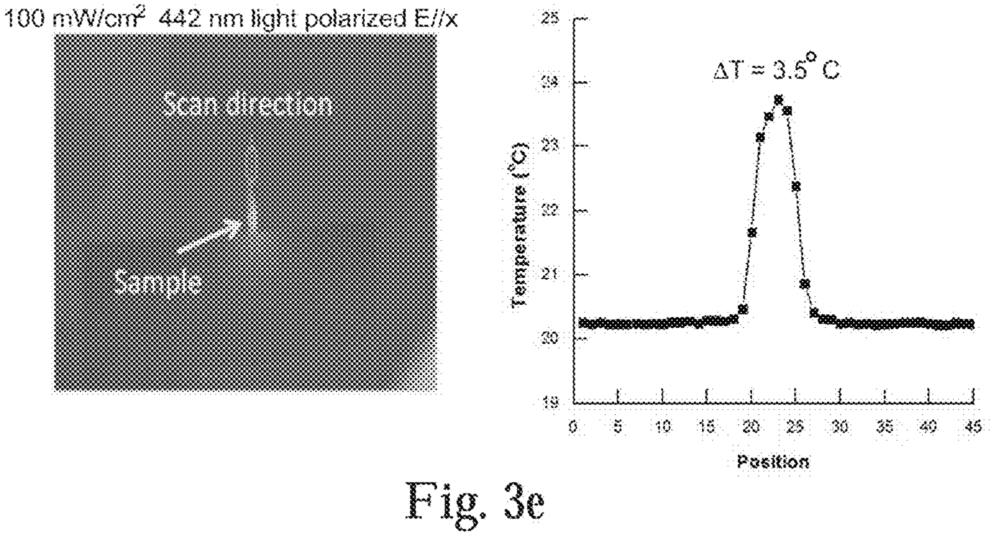

FIG. 1 presents the baseline thermomechanical properties and a typical polarized optical micrograph (POM) for the model polymeric material, referred to here as PD-20CL. The storage modulus (E'), loss modulus (E"), and loss tangent (tan δ) were measured with dynamic mechanical analysis (DMA). The E' and E" at 25° C. are 1 GPa and 120 MPa, respectively. Importantly for the results presented here, PD-20CL has a glass transition temperature of 60° C. (peak of tan δ) confirming this sample is glassy at room temperature.

The photoresponse of cantilevers composed of PD-20CL when subjected to 80 mW/cm$^2$ 442 nm exposure is summarized in FIGS. 2(*a*) thru 2(*e*). Light in this wavelength regime allows for polarization controlled contractile and expansive strains to be generated, resulting in forward and reverse (bidirectional) bending. FIG. 2(*a*) plots the magnitude of the bending angle as a function of the angle between the long axis (x) of the cantilever and the linear polarization of the laser (E), which is rotated from 0° (E//x) to 90° (E⊥x). The direction of the laser exposure in the images in FIG. 2(*a*) is from left to right. A linear dependence of bending angle on polarization angle is observed, with negligible bending in the condition when E is 45° to x. As shown in FIG. 2(*b*), glassy samples such as PD-20CL when exposed with 442 nm light maintain an optically fixed shape that has been observed to last for more than one year. The permanent, lasting optically fixed shape is due to light-directed, adjustments to the polymer chains in the glassy matrix discussed in detail later. The optically fixed temporary state evident in FIG. 2(*b*)-*ii* can be optically released by exposure to circularly polarized light (CPL) (FIG. 2(*b*)-*iii*) restoring the cantilever to the permanent shape (vertical position, FIG. 2(*b*)-*iv*)). Although by name CPL is polarized light, in its employment here it can be thought of as quasi-unpolarized as a given plane of the cantilever is exposed to all linear components (in the terminology of FIG. 2(*a*), polarization angles 0-360°) within two fs which is considerably faster than the photochemical response of these azobenzene materials. As such, exposure to CPL serves to randomize the photoreconfigured polymer network restoring it to an original, unaligned state.

The optically fixed temporary shapes in FIG. 2(*b*) fix the optically generated strain, resulting from the reorientation of the azobenzene chromophores in the network. Mechanically induced strains can also be optically fixed, as observable in FIGS. 2(*c*) and 2(*d*). Shown in the images in FIG. 2(*c*), a free standing PD-20CL film is deformed into an arc. The arc like shape is formed by mechanically straining the film held within the tweezers. Placing the mechanically deformed state under 80 mW/cm$^2$ 442 nm light for as few as 5 seconds fixes the arc in the absence of mechanical deformation, evident in FIG. 2(*c*)-*iv*. This shape has been indefinitely retained for a number of weeks in the laboratory. As in FIG. 2(*b*), exposure to CPL from the 442 nm laser undoes the optically fixed temporary state, restoring the sample to the permanent state. As a second example of optical fixing of mechanical imparted strain into PD-20CL, the film is mechanically deformed in the cantilever geometry as well. As shown in FIG. 2(*d*), the originally vertical cantilever is deformed with mechanical force into a complex curve. Exposure of the material to 442 nm irradiation for as little as 5 seconds optically fixes this complex shape in the absence of light.

For comparison, FIG. 2(*e*) presents images of a glassy PD-20CL film subjected to similar mechanical deformation in the absence of optical fixing. Not surprisingly, upon release of the mechanical deformation the glassy azo-LCN material does not retain the temporary state (FIG. 2(*e*)-*iii*). The optically fixed temporary shapes observed in FIGS. 2(*b*), 2(*c*), and 2(*d*) can be restored to the original permanent shape with CPL exposure (as shown) or by heating the samples above $T_g$. Quantification of the optical fixity of these materials is subject to ongoing examination.

The representative photomechanical response observed for the model material system PD-20CL to irradiation with 100 mW/cm$^2$ of 442 nm light is once again presented pictorially in FIG. 3(*a*). The 5 mm×1 mm cantilever is originally vertical (FIG. 3(*a*)-*i*). Upon irradiation with 442 nm light polarized parallel to the long axis (E//x) of the cantilever, the cantilever bends approximately 21° into the direction of the incident exposure (FIG. 3(*a*)-*ii*). When the polarization direction of the incident 442 nm irradiation is rotated such that it is orthogonal to the long axis of the cantilever (E⊥x), the direction of the cantilever reverses to approximately −22° (FIG. 3(*a*)-*iv*). Optical fixing is evident in FIG. 3(*a*)-*iii* and 3(*a*)-*v* upon removal of the 442 nm irradiation and can retain this temporary state for many months.

The photoresponse of PD-20CL to 442 nm exposure differs from the more commonly utilized UV light (375 nm here) in that the photochemical mechanism is proposed to be a result of repeated trans-cis and cis-trans photoisomerizations. It should be noted that in the model material PD-20CL, exposure to 375 nm does not exhibit permanent, optically fixed shapes. Comparatively, 375 nm light causes only trans-cis isomerisation of the class of azobenzene employed here, which results in a buildup of cis isomers that disrupt the order of the LCN causing macroscopic photo-deformation observed in cantilevers as bending. As such, UV-directed changes are metastable and governed by the lifetime of the thermodynamically unstable cis isomers which can range from a few hours to a few days. In contrast to the optical fixing observed to 442 nm irradiation apparent in FIG. 3(*a*)-*iii* and FIG. 3(*a*)-*v*, if the UV light is shuttered after the cantilever is bent to FIG. 3(*b*)-*ii* or FIG. 3(*b*)-*iii* the magnitude of the bending gradually lessens over approximately 16 hours eventually restoring the film to the original vertical position (FIG. 3(*b*)-*iv*).

The photochemical mechanism underlying the optically fixable shape memory discussed here are differentiated in FIG. 3(*c*) which compares the absorption spectrum for the PD-20CL material before irradiation to those measured after irradiation to 375 nm and 442 nm (both linearly polarized such that the polarization (E) was parallel to the long axis of the cantilever (x)). It is important to note that the experimental setup employed here is capable of distinguishing absorbance values up to OD 6. The strong π-π* absorption peak associated with the trans isomer is apparent before irradiation centered at approximately 365 nm. The absence of a peak or shoulder near 450 nm indicates that the cis isomer concentration is near zero. However, upon irradiation with 50 $mW/cm^2$ of 375 nm light for 3 minutes the π-π* absorption for PD-20CL completely disappears. The large increase in absorption at 455 nm confirms that to these irradiation conditions, the film is nearly entirely composed of cis isomer. Comparatively, irradiation to 100 $mW/cm^2$ 442 nm light induces a slight decrease in absorption at 365 nm (π-π*) which is accompanied by a small shoulder that appears around 455 nm. The absorption spectrum after 442 nm exposure represents the photostationary state absorbance for the PD-20CL.

The results presented in FIG. 3(*c*) further elucidate the importance to utilization of so-called blue-green' irradiation (here, 442 nm) for the generation of optically-fixable shape memory in azobenzene systems. As expected, UV light irradiation induces trans-cis isomerization of the azobenzene chromophores of PD-20CL.

Irradiation to 442 nm light induces a small change in the absorbance of the trans isomer and a corresponding (and expected) increase in the equilibrium cis isomer concentration. The results presented in FIG. 3(*c*) do not distinguish whether the optical strain at the root of the photoinduced bending observed to 442 nm exposure is a result of the small amount of trans-cis isomerization or caused by the trans-cis-trans reorientation mechanism. The fundamental photochemical mechanism to 442 nm exposure is further elucidated in FIG. 3(*d*), which plots the maximum of the absorbance value at 365 nm before irradiation (i), after irradiation with 442 nm with E⊥x (ii), after irradiation with 442 nm with E//x (iii), and after four days in the dark (iv, previous exposure to E//x). A polarizer was rotated from 0-360° to capture the polarization dependent absorption of the material in these conditions, where 0° is parallel to the long axis of the cantilever (x). As expected, before exposure the PD-20CL material has near uniform absorbance to 0-360° polarization (in other words, the dichroic ratio (R), is equal to 1). This confirms that initially, the azobenzene chromophores in the local domain structure are randomly oriented within the material. Upon exposure to 442 nm (both E//x and E⊥x) the absorbance of the π-π* absorbance peak at 365 nm decreases, due to the formation of cis isomers. Importantly, 442 nm irradiation also induces dichroism in the PD-20CL material. The dichroic ratio (R) can be given as $R=(A\|/A\perp)$. To E⊥x, it is clear that the absorbance at 90° and 270° increases while the absorbance at 0° and 180° decreases resulting in an increase in R to 1.12. This photoinduced dichroism apparent in the π-π* absorption of PD-20CL indicates that 442 nm exposure induces alignment of some portion of the azobenzene chromophores orthogonal to the polarization of light.

This same material was then immediately exposed (from the E⊥x condition, although identical results are observed when the material has no exposure history) to 442 nm polarized E//x, and the ellipsoidal dependence of the π-π* absorbance of PD-20CL rotates, such that now the maximum absorbance is observed at 0° and 180° and minimum absorbance at 90° and 270° once again exhibiting an R of 1.12. After the experiment, the film was stored in the dark and the polarization dependence of the π-π* absorption for the material was reassessed after four days (taking great care to re-examine the identical area previously probed). Previously, this sample was exposed to 442 nm polarized E//x. As plotted in FIG. 3(*d*), the photoinduced dichroism is maintained (R=1.11) while the overall absorbance increases as the cis-isomer relaxes in the dark. The preservation of the dichroism for this material after four days confirms that the optical fixing observed to this materials are due to real, unrecoverable and photoinduced changes to the polymer network.

To confirm that the reorientation observed in FIG. 3(*d*) is not a product of photothermal heating, the PD-20CL cantilever was imaged with an infrared camera during exposure to 442 nm irradiation over a range of intensity levels and polarization orientations. FIG. 3(*e*) is a thermal image of the PD-20CL cantilever during exposure to 100 $mW/cm^2$ 442 nm light polarized E//x. The temperature was extracted from the images along the length of the cantilever (dotted line in FIG. 3(*e*)-*i* and plotted in FIG. 3(*e*)-*ii* as a function of pixel number. From FIG. 3(*e*)-*ii* a maximum temperature rise under these illumination conditions is determined to be 3.5° C. Thus, exposure to 442 nm does not heat this PD-20CL cantilever above the glass transition temperature of the polymer or through any thermotropic liquid crystalline clearing temperature.

Figure 4A:
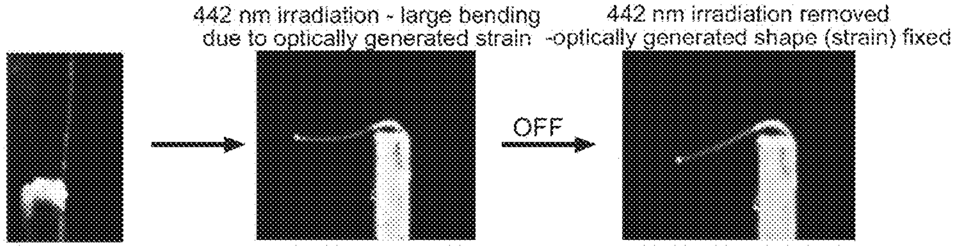
FIGS. 4(*a*)-4(*b*) illustrate another example of optically fixable shape memory, observable in a non-liquid crystalline azobenzene-functionalized polyimide.
Figure 4B:
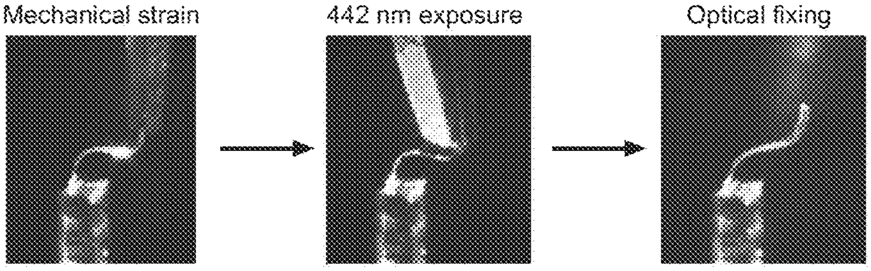

A second model compound is introduced to confirm that optically-fixable shape memory is observable in conventional polymeric materials as well. An azobenzene-functionalized polyimide was fabricated as specified in [Seng Tan AF1279, Wang et. al Macromolecules, 2011]. This material was stretched to 30-100% of its original length, and subsequently exposed to 442 nm irradiation. As was demonstrated in FIGS. 2(*a*) thru 2(*e*) for a glassy, liquid crystalline polymer network, this azobenzene-functionalized amorphous polymer also is capable of optical fixing. FIG. 4(*a*) shows optical fixing of the optically induced strain in the material. The originally vertical cantilever (FIG. 4(*a*)-*i*) is exposed to 442 nm light causing large, nonlinear bending (FIG. 4(*a*)-*ii*). Upon removal of the 442 nm light, the cantilever retains the optically fixed strain indefinitely (FIG. 4(*a*)-*iii*). As with the PD-20CL material, the azobenzene-functionalized polyimide can also retain mechanically induced strains as illustrated in FIG. 3(*b*). Once again, the cantilever was originally vertical. A tweezers was used to impart a mechanical strain into the material (FIG. 4(*b*)-*i*) upon which it was exposed to 442 nm light (FIG. 4(*b*)-*ii*). Upon removal of the 442 nm irradiation, the complex shape was retained indefinitely in the material (FIG. 4(*b*)-*iii*).

Figure 5:
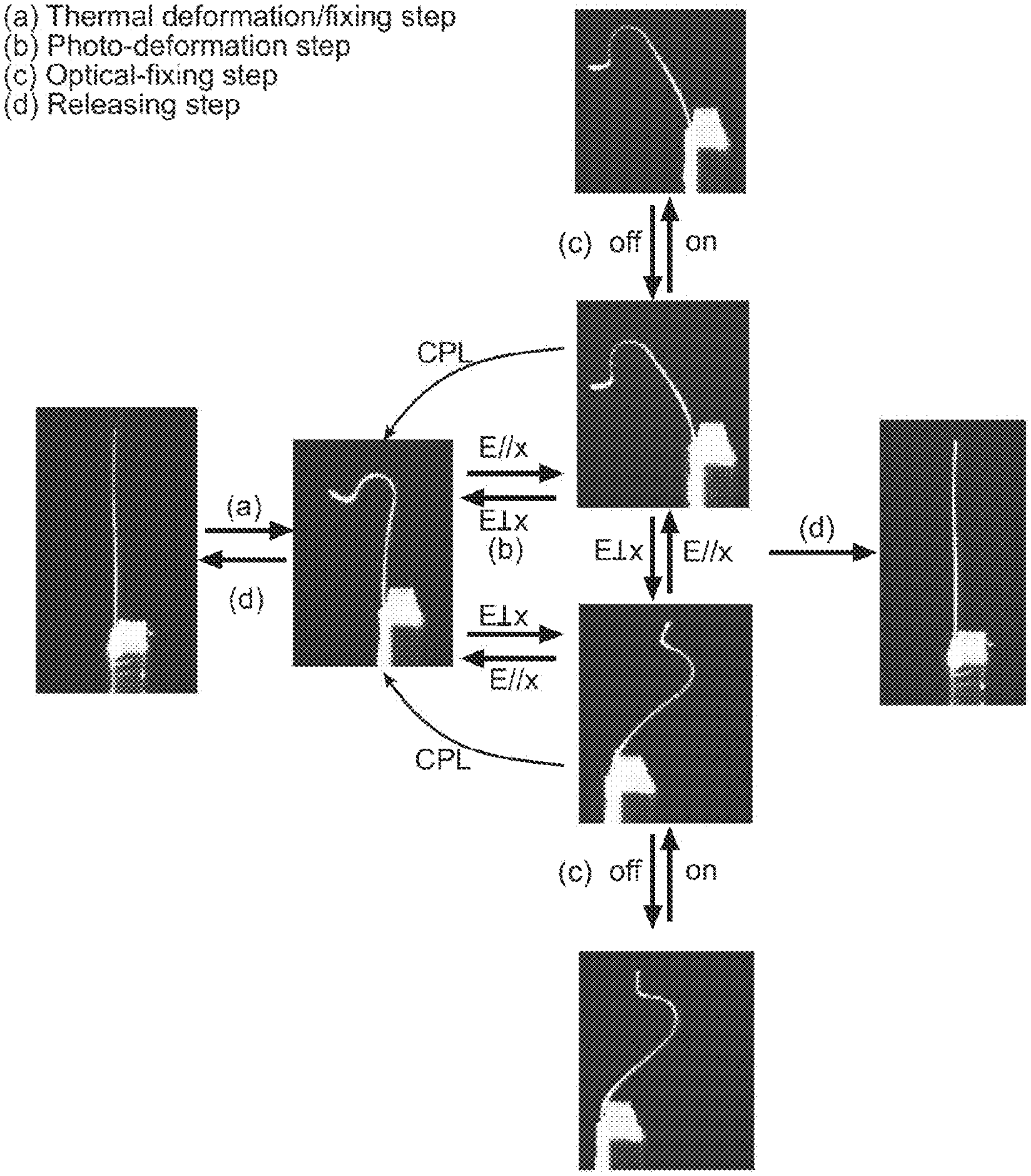
FIG. 5 is a demonstration of optical fixing of a thermally fixed temporary shape in the model material system, PD-20CL.

The realization of simultaneous optically and thermally-fixed shape memory is explored in FIG. 5 for the model material system PD-20CL. A "hook"-like shape was thermally fixed per so-called, one-way thermally fixable shape memory. The initially vertical cantilevers (PS) were deformed at 100° C. (ca. 40° C. higher than $T_g$) and quenched to room temperature to fix the hook-like temporary shapes, yielding a thermally fixed temporary shape (step a, T-TS). From T-TS, the cantilever was exposed to 80 $mW/cm^2$ linearly polarized 442 nm laser light which causes bending (described in FIG. 2) that is dependent on the alignment of the linear polarization on the sample (step b). As in FIG. 2(*b*), with removal of 442 nm light the PD-20CL azo-LCN cantilever retains the bent shape (step c, P-TS1 and P-TS2). Exposing P-TS1 or P-TS2 to 442 nm CPL undoes the optical fixing but maintains the thermally fixed temporary shape, restoring the sample to T-TS (optical recovery). The original, permanent shape of the PD-20CL azo-LCN cantilever is recovered by reheating any of the temporary shapes (T-TS, P-TS1, P-TS2) above $T_g$, which results in relaxation of the polymer network chains to the entropically favourable conformational state (step d, thermal recovery).

What is claimed is:

1. A method for optically fixing a glassy polymeric material containing covalently bonded photochromic units of azobenzene, the method comprising:

providing the glassy polymeric material having an original shape;

exposing the glassy polymeric material in the original shape to a linearly polarized radiation that is capable of inducing trans-cis and/or cis-trans isomerization of azobenzene to induce light-directed, adjustments to photochromic units in the glassy polymeric material that causes polarization controlled contractile and expansive strains to be generated to cause the glassy polymeric material to change shape into an optically fixed temporary state;

discontinuing the linearly polarized radiation exposure, wherein optically fixed temporary state of the glassy polymeric material is maintained; and returning the glassy polymeric material to the original shape by:

exposing the glassy polymeric material in the optically fixed temporary state to a radiation that is capable of inducing trans-cis and/or cis-trans isomerization of azobenzene, which can thereby release the glassy polymeric material from the optically fixed temporary state, wherein the radiation is a circularly polarized radiation, wherein the glassy polymeric material containing covalently bonded photochromic units of azobenzene is an azobenzene-functionalized polyimide.

2. The method of claim 1, wherein the linearly polarized radiation and the circularly polarized radiation are blue green radiation.

3. The method of claim 2, wherein the blue green radiation is 442 nm.

4. The method of claim 1, wherein the glassy polymeric material containing covalently bonded photochromic units of azobenzene is a glassy liquid crystal.

5. The method of claim 1, wherein the glassy polymeric material having an original shape is in a straight form of a cantilever having a long axis, and wherein the optically fixed temporary state is a bent form of the cantilever having a bending angle relative to the long axis.

6. The method of claim 1, wherein a magnitude of the bending angle is a function of an angle between the long axis of the cantilever and the linear polarization.

7. The method of claim 6, wherein the magnitude of the bending angle is increased as the linearly polarized radiation is rotated away from 45° to 0°, which is parallel to the long axis, and away from 45° toward 90°, which is perpendicular to the long axis.

8. The method of claim 1, wherein the glassy polymeric material containing covalently bonded photochromic units of azobenzene has a dichroic ratio equal to 1 prior to exposure to the radiation, and wherein the glassy polymeric material in the optically fixed temporary state after exposure to the irradiation has a photoinduced dichroism.

* * * * *